Jan. 23, 1945.  I. Z. SMOKER  2,367,970
BALE LOADER
Filed Oct. 14, 1943  4 Sheets-Sheet 1
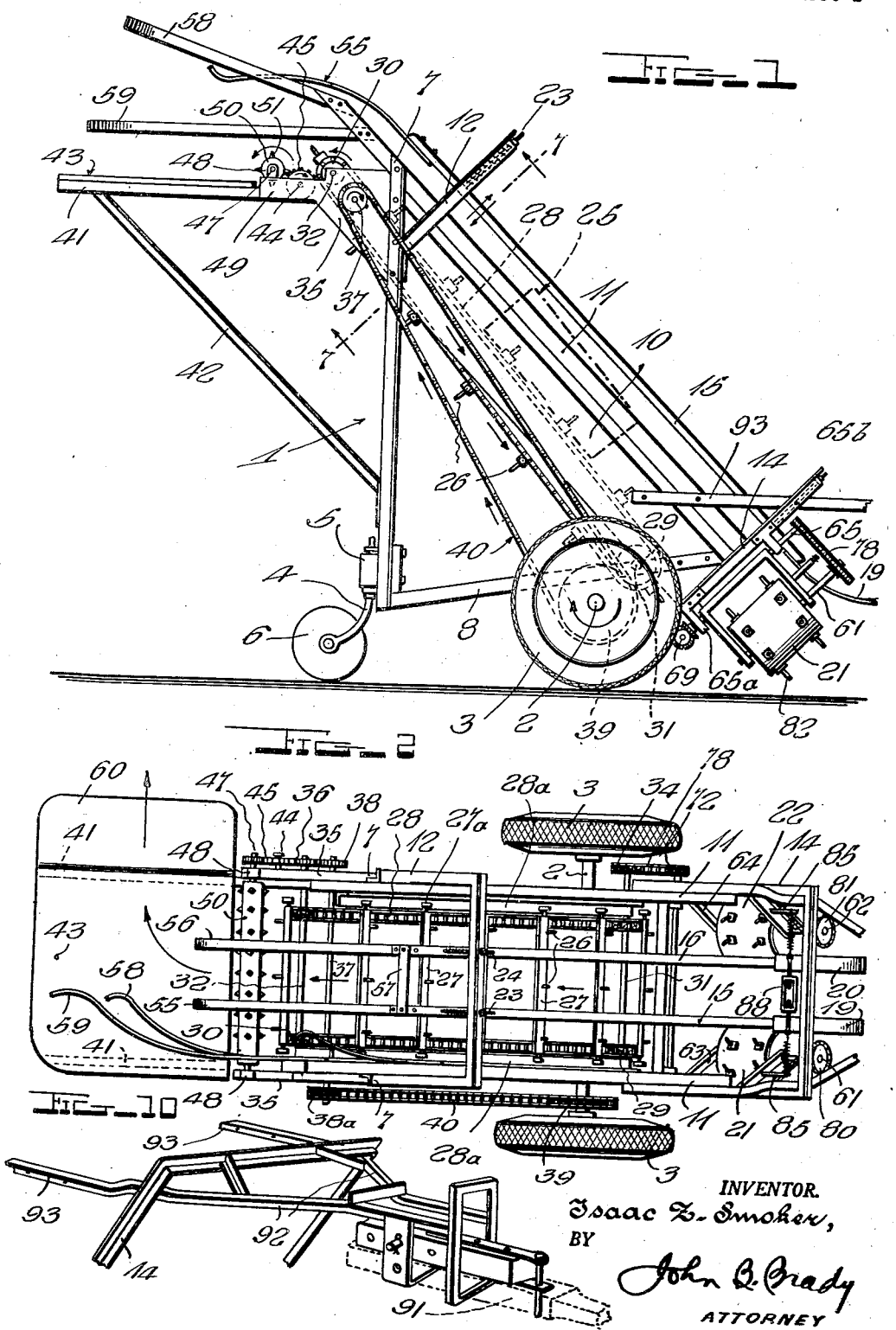

Jan. 23, 1945.   I. Z. SMOKER   2,367,970
BALE LOADER
Filed Oct. 14, 1943   4 Sheets-Sheet 2

INVENTOR.
Isaac Z. Smoker,
BY
John B. Brady
ATTORNEY

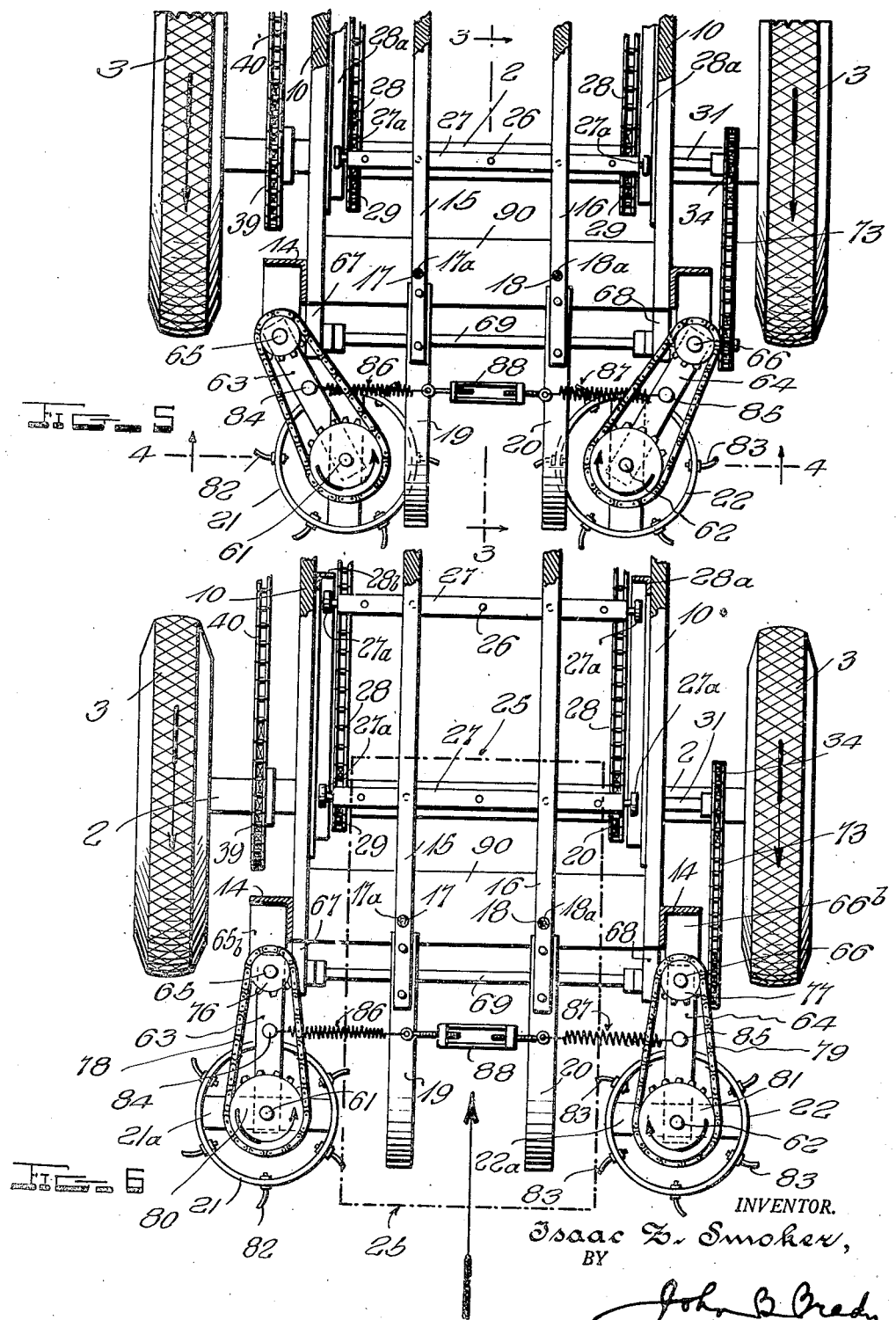

Jan. 23, 1945.     I. Z. SMOKER     2,367,970
BALE LOADER
Filed Oct. 14, 1943     4 Sheets-Sheet 4
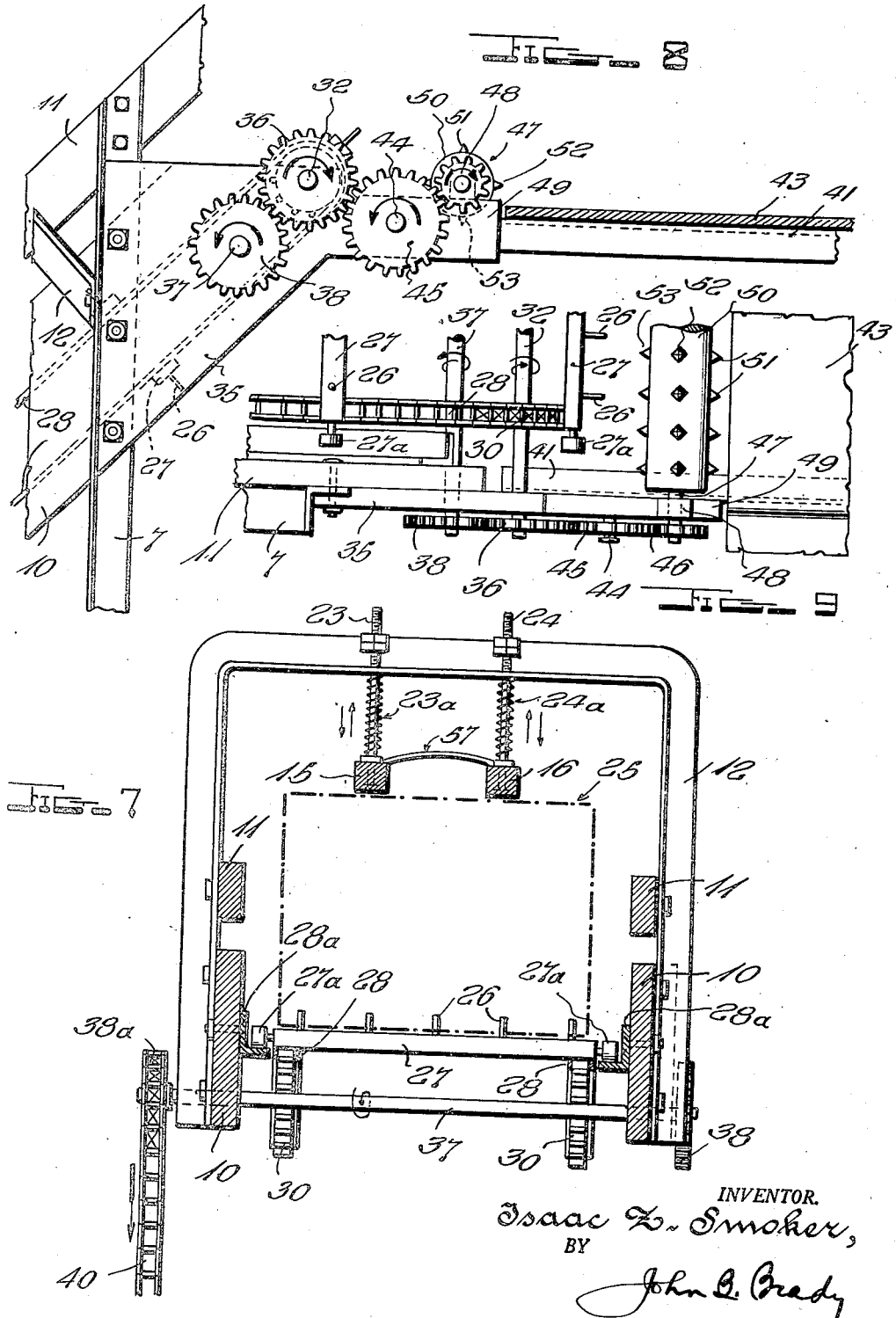
INVENTOR.
Isaac Z. Smoker,
BY
John B. Brady
ATTORNEY Patented Jan. 23, 1945

2,367,970

UNITED STATES PATENT OFFICE 2,367,970

BALE LOADER

Isaac Z. Smoker, Intercourse, Pa.

Application October 14, 1943, Serial No. 506,238

10 Claims. (Cl. 198—9)

My invention relates broadly to bale loaders and more particularly to a portable vehicle type bale loader.

One of the objects of my invention is to provide a construction of portable bale loader which operates automatically as the bale loader is pulled about the fields for cooperation with an automatic baler for loading the completed bales for transportation and marketing.

Another object of my invention is to provide a construction of bale loader which will automatically pick up, elevate and place bales on a raised platform ready to be packed in a suitable vehicle for transportation.

Still another object of my invention is to provide an improved construction of bale loader which may be hitched to the side of a truck, tractor trailer or a horse drawn wagon for picking up bales in the field after operation of an automatic baler.

A further object of my invention is to provide an improved construction of bale loader in which bale pick-up mechanism is located adjacent the base of the bale loader for engaging bales after the operation of an automatic baler and elevating the bales to a position for loading any suitable vehicles for transportation of the bales.

A still further object of my invention resides in an improved construction of bale pick-up mechanism and bale delivery mechanism disposed adjacent opposite ends of an inclined elevator for automatically loading bales from the field into vehicles for transportation.

Figure 3:
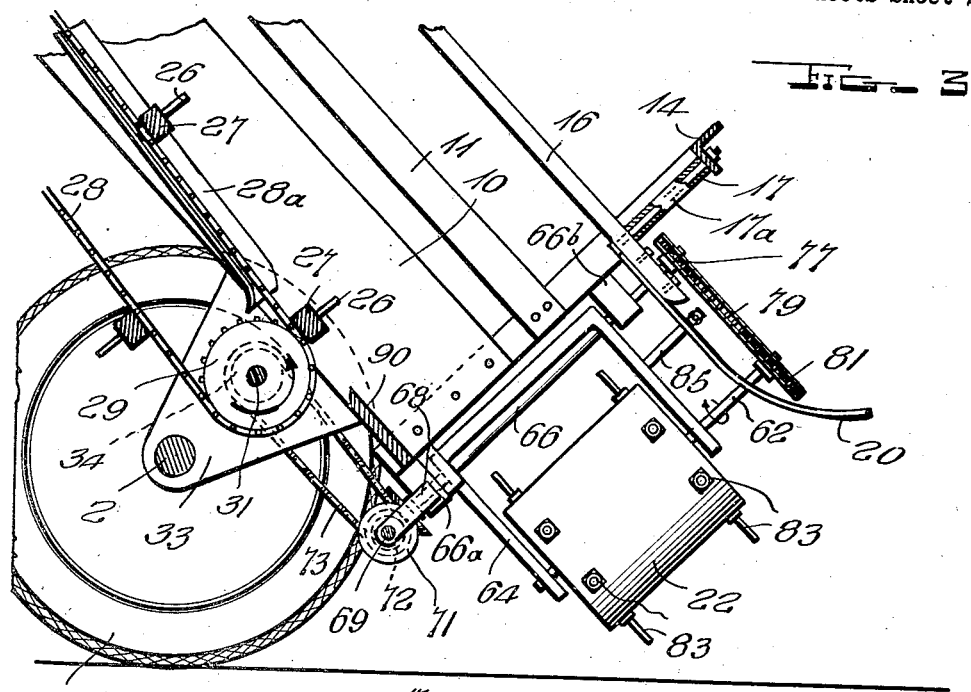
Figure 4:
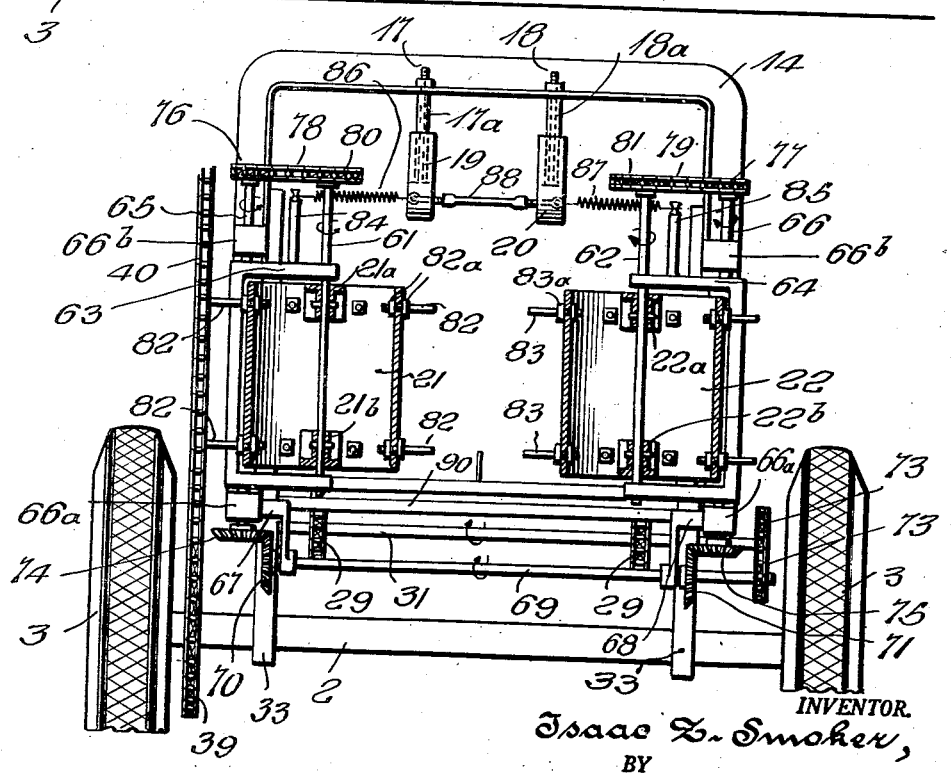

Other and further objects of my invention reside in improved constructional features for a bale loader as set forth more fully in the specification hereinafter following by reference to the accompanying drawings, in which:

Figure 1 is a side elevational view of the bale loader of my invention; Fig. 2 is a top plan view of the bale loader of my invention; Fig. 3 is an enlarged view of a fragmentary portion of the base of the bale loader in longitudinal section on line 3—3 of Fig. 5 and showing certain of the parts in cross section; Fig. 4 is a transverse sectional view taken at the base of the bale loader looking in the direction of line 4—4 of Fig. 5 and showing the bale mechanism in a position ready to engage a bale in the field for elevation by means of elevating mechanism; Fig. 5 is a plan view of the base of the bale loader showing the bale pick-up mechanism in a position to engage a bale for advancing the bale of the elevator mechanism; Fig. 6 is a view of the base of the bale loader similar to the view shown in Fig. 5 with the bale pick-up mechanism in engagement with the bale and operating to advance the bale to the elevator; Fig. 7 is a transverse sectional view taken on line 7—7 of Fig. 1 and illustrating the elevator mechanism adjacent the delivery position at the top of the bale loader; Fig. 8 is a fragmentary side elevational view of the bale driving mechanism adjacent the top of the bale loader; Fig. 9 is a fragmentary plan view of the bale drive mechanism located at the top of the baler and shown in side elevation in Fig. 8; and Fig. 10 is a view illustrating the manner of connecting the bale loader to a tractor or other vehicle for pulling the bale loader about the field for simultaneously imparting movement to the pick-up, elevating and delivery mechanism.

The bale loader of my invention has been found to be highly practical in its construction and operation and although I have described a preferred embodiment of my invention, I desire that it be understood that the particular construction illustrated is to be considered in the illustrative sense and that variations in details of construction are contemplated within the scope of my appended claims.

Referring to the drawings in detail, reference character 1 designates the chassis of the bale loader comprising an angle iron frame supported by an axle structure represented at 2 on which traction wheels 3 are journaled. An orientable, pivotally mounted fork member 4 is journaled as represented at 5 centrally of the chassis 1. Fork member 4 serves as a journaling means for the wheel 6 enabling the bale loader to be readily pulled about a field by a tractor, a tractor trailer, a horse, or hitched to a horse drawn wagon or truck, for picking up bales that have been baled by an automatic baler and left substantially in a row in the field. The bale loader of my invention picks up the bales from the row of bales in the field and elevates the bales to a position in which the bales may be readily packed into a vehicle for transportation. The chassis 1 is movably supported on the three wheel carrier which may be pulled by the truck, tractor trailer, or a horse drawn wagon.

The chassis 1 includes a vertically extending angle iron frame 7 and an angle iron frame 8 projecting in a substantially horizontal direction but at an acute angle with respect to the vertically extending angle iron frame 7. That is, angle iron frames 7 and 8 form a support adjacent their extremities for the side frames 10 and 11. The side frames 10 and 11 extend in a direction substantially 45° with respect to a horizontal plane. Side frames 10 and 11 are bolted or riveted to the angle iron frames 7 and 8. Transversely extending angle iron frames 12 and 14 which are substantially hood-shaped in contour have their vertically extending flanges secured to the side frames 10 and 11 and to the angle iron frame members 7 and 8 forming the chassis, thereby increasing the rigidity of the portable structure. The frames 12 and 14 extend parallel with the planes of the side frames 10 and 11 and adequately clear the normal heighth of the bale which is elevated by the bale loader and extend normal to the supporting portions of the frames in a position transverse to the chassis of the loader and serve as supports for the longitudinally extending bale guide bars shown at 15 and 16. The longitudinally extending bale guide bars 15 and 16 are suspended adjacent the base of the bale loader by bolt members 17 and 18 depending from the transversely extending portion of frame 14 and passing through longitudinally extending guide bars 15 and 16. Sleeve members 17a and 18a extend over bolt members 17 and 18 and serve as spacer members for maintaining the longitudinally extending guide bars 15 and 16 in predetermined position. Guide bars 15 and 16 each support leaf spring members 19 and 20 serving to engage the bale and yieldingly urge the bale into engagement with the pick-up means constituted by the rotary pick-up means represented at 21 and 22.

The opposite ends of the longitudinally extending guide bars 15 and 16 are resiliently suspended by bolt members 23 and 24 which extend from the longitudinally extending guide bars 15 and 16 through coil springs 23a and 24a. Longitudinally extending guide bars 15 and 16 may be displaced upwardly against the yieldable action of coil springs 23a and 24a, thereby pressing the bale as represented in dotted lines at 25 during the process of elevation thereof into engagement with the projecting spikes 26 carried by the strips 27 supported at spaced intervals along the endless chains 28 which are driven by sprocket wheels 29 and 30 mounted on shafts 31 and 32 respectively. In order to insure the adequate support of the bales 25 in the course of their elevation, I provide angle iron guide rails 28a secured to the inner faces of the side frame members 10 and directed toward the endless chains 28. These angle iron members are shaped and positioned to form supporting rails or tracks for roller members 27a carried by opposite ends of transversely extending strips 27 forming part of the endless conveyor. Thus the endless conveyor is firmly supported while carrying the heavy load of the bales as the bales are being elevated. The load is taken off of the chains 28 and supported by rollers 27a coacting with the angle iron rails 28a. Shaft 31 is journaled in frame members 33 which interconnect axle 2 with the chassis of the bale loader. Shaft 31 projects beyond one side of the side frames 10-11 and is provided with a sprocket wheel 34 thereon. Sprocket wheel 34 serves as a drive means for imparting movement to the bale pick-up mechanism.

The opposite end of the conveyor which operates over sprocket wheels 30 carried by shaft 32 is positively driven. The drive mechanism for the bale pick-up mechanism is shown more clearly in Figs. 1, 2, 8 and 9. Shaft 32 is journaled in bracket plates 35 which are secured to the vertically extending angle iron frame members 7. Shaft 32 projects beyond one side of the chassis and carries gear wheel 36 thereon. A drive shaft 37 is journaled in the bracket plates 35 and projects beyond one side of the bale loader and carries gear wheel 38 thereon which serves as the main drive for the mechanism of the bale loader. The bale loader is driven by means of sprocket wheel 39 which is carried on axle 2 of wheels 3—3 and is rotated as the bale loader is pulled over the field by a tractor, tractor trailer, truck, horse, or horse and wagon. Sprocket wheel 39 rotates imparting movement to the engaged sprocket chain 40 that operates over gear wheel 38 for driving shaft 37. Shaft 37 through gear 38 drives gear 36 which is secured on shaft 32 carrying sprocket wheels 30 which impart movement to endless conveyor chains 28.

The vertically extending angle irons 7 have a horizontally extending platform connected thereto supported by substantially horizontally extending angle iron members 41 which are braced by angularly extending angle irons 42 for supporting platform 43. Platform 43 serves as a bale receiving support adjacent the top of the bale loader. One of the angle iron members 41 and an associated bracket plate 35 serve as a supporting means for stub shaft 44 which carries intermediate gear 45 which meshes with gear 36 and a gear 46 carried by transversely extending shaft 47. The transversely extending shaft 47 is journaled at opposite ends in bearings 48 carried by an extension 49 on bracket plates 35. The shaft 47 carries a power driven take-off roller 50 having rows of spikes 51, 52, 53, etc. projecting radially therefrom and serving as engaging means for the bales of hay for moving the bales of hay from a position at the top of the endless conveyor to a position on platform 43. That is to say, as the bales of hay 25 are guided over the top of the elevating conveyor by continuously moving spikes 26 the spikes 51, 52, 53, etc. in the power driven take-off roller engage the bottom of the bales and continue to move the bales to a delivery position on platform 43. The bales of hay are guided against the power driven take-off roll by leaf spring members 55 and 56 which project from the ends of the longitudinally extending guide bar members 15 and 16, respectively. The leaf spring members 55 and 56 are yieldable and tend to constantly urge the bale 25 as it advances over the top of the conveyor into engagement with the spikes 51, 52, 53, etc. carried by the power driven take-off roller 50 for continuously driving the bale to a delivery position at the top of the bale loader. In order to preclude spreading of the longitudinally extending guide bar members 15 and 16, I provide an interconnecting transverse bar or link 57 between the longitudinally extending guide bar members.

In order to direct the bale to a delivery position on platform 43, I provide sets of leaf spring members 58 and 59 secured to an upper extension of side frame member 11. Leaf spring member 59 extends in a substantially horizontal direction approximately parallel with the platform 43 and is shaped to provide an abutment for the end of the bale for imparting a twist to the bale which turns the bale in a direction for discharge down a chute represented at 60 in Fig. 2. The chute 60 is suitably supported at an angle to the chassis of the bale loader for directing the baled hay into a vehicle or car for transportation. The leaf spring member 58 is disposed at an appropriate angle to insure the positioning and directing of the bale of hay toward the chute 60. Leaf spring members 58, 59, 55 and 56 each coact in advancing the bale of hay to a proper delivery position.

The bale pick-up mechanism comprises the cylindrical members 21 and 22 having diametrically extending struts 21a, 21b, 22a and 22b therein which serve as mounting means for the cylindrical members on drive shafts 61 and 62. Drive shafts 61 and 62 are journaled in yoke-like frame members 63 and 64 which are pivotally mounted on shafts 65 and 66. The shafts 65 and 66 are journaled at opposite ends in brackets 65a, 65b and 66a and 66b which extend from the angle iron frame 14. The brackets support the shafts 65 and 66 which support the yoke-like frame members 63 and 64 in such manner that the yoke-like frame members 63 and 64 are free to swing inwardly, limited by abutment with extensions 67 and 68 on members supported by side frames 10 of the bale loader. The extensions 67 and 68 on the members which are supported by the side frames 10 of the bale loader also serve as journaling means for the shaft 69 which carries bevel gears 70 and 71 and sprocket wheel 72 thereon. Sprocket wheel 72 is driven by chain 73 operating from the driven sprocket wheel 34. The bevel gears 70 and 71 mesh with bevel gears 74 and 75 carried by shafts 65 and 66 driving these shafts as the bale loader travels over the field from the main drive operated from traction wheels 3. The driven shafts 65 and 66 each carry sprocket wheels 76 and 77 on the extremities thereof. These sprocket wheels 76 and 77 drive chains 78 and 79 which engage sprocket wheels 80 and 81 carried by the shafts 61 and 62, respectively, for thus imparting rotary motion to the cylindrical members 21 and 22.

The cylindrical members 21 and 22 each carry sets of spikes disposed at spaced intervals as represented at 82 and 83. These sets of spikes are anchored firmly to the cylindrical surface of the cylindrical members 21 and 22 and are each curved as represented in Figs. 5 and 6 in order to facilitate disengagement from the bale after effecting an engagement therewith during the pick-up process. The spikes 82 and 83 are each individually replaceable and may be readily renewed by removing the threaded nut engaging means 82a and 83a, respectively for facilitating repair and maintenance of the equipment. The angularly swingable yoke-like frames 63 and 64 are each provided with pin members 84 and 85 projecting vertically therefrom for connection of spring members 86 and 87 which constitute a resilient linkage tending to continuously urge the rotary members 21 and 22 toward each other to the limit of the position shown in Fig. 5. In order to adjust the tension of the linkage, I provide an adjustable turn buckle device 88 intermediate the spring members 86 and 87 for thereby controlling the tension to which the rotary members are subjected in moving the sets of spikes 82 and 83 into engagement with the bales 25. Adjustment of turn buckle 88 may be made from time to time to compensate for changes in the tension of coil springs 86 and 87.

The bale loader chassis is strengthened by means of a transversely extending bar or strut shown at 90 extending between the side frame members 10. The bale loader is drawn about the field by means of a tractor, tractor trailer, truck, horse or horse and wagon connected to draw bar represented at 91 which connects through yoke bars shown at 92 with the chassis of the bale loader. The connection is reinforced by connections with angle iron frame 14 and side frames 10 through ends 93 of the yoke frame 92.

While I have shown one of the preferred constructions of wheeled support for the bale loader, I realize that various modified forms of wheeled mounts and drives for the bale loader may be employed. For example, I may provide a three wheeled mount in which two of the mounting wheels are swiveled adjacent one side of the bale loader while a third drive wheel is mounted on the opposite side of the bale loader in a position intermediate the swivel wheels. The intermediate wheel is connected to the drive mechanism of the bale loader through a universal joint and through a slip drive shaft for allowing necessary lost motion in the driving operation.

I realize that other and further modifications of the structure of bale loader of my invention may be made and I intend no limitations upon my invention other than may be imposed by the scope of the appended claims.

What I claim as new and desire to secure by Letters Patent of the United States is as follows:

1. A bale loader comprising a frame structure, an endless conveyor mounted in said frame structure for engaging and elevating bales along an inclined plane from a position adjacent the base of said bale loader to a position adjacent the top of the bale loader, rotary pick-up means having yieldable and variable spacial relation to each other adjacent the base of said bale loader, and disposed on axes substantially normal to the inclined plane of said conveyor, and means for simultaneously driving said pick-up means and said conveyor for yieldably engaging bales and elevating the bales along the inclined plane of said conveyor.

2. A bale loader comprising a frame structure including an endless conveyor for engaging and elevating bales along an inclined plane from a position adjacent the base of the bale loader to a delivery position adjacent the top of the bale loader, a pair of angularly movable yoke-like frames journaled adjacent the base of said bale loader, a rotary drum-like member journaled in each of said yoke-like frame members on an axis substantially normal to the inclined plane of said conveyor, bale engaging spikes carried by each of said rotary drum-like members, means for rotatably driving said rotatable drum-like members and simultaneously driving said conveyor, and means interconnecting said yoke-like frames for urging said bale engaging spikes on said rotatable drum-like members into engagement with a bale for advancing the bale onto said endless conveyor for delivery thereby adjacent the top of the bale loader.

3. A bale loader comprising a frame structure including an endless conveyor for engaging and elevating bales along an inclined plane from a position adjacent the base of the bale loader to a delivery position adjacent the top of the bale loader, a pair of swingable frame-like members journaled adjacent opposite sides of said frame structure, a rotary cylindrical-like member journaled in each of said frame members on an axis substantially normal to the inclined plane of said conveyor, bale engaging spikes projecting from said rotary cylindrical-like members, spring means interconnecting said frame-like members for urging said members toward each other whereby the bale engaging spikes carried thereby effect engagement with a bale for delivering the bale to said endless conveyor, and means for simultaneously driving said cylindrical-like members and said conveyor.

4. A bale loader comprising a frame structure including an endless conveyor mounted in an inclined plane for elevating and delivering bales from a position adjacent the base of the bale loader to a position adjacent the top of the bale loader, frame-like members journaled adjacent the base of said bale loader and swingable from a substantially separated position to a limited spacially separated position, rotary members journaled in each of said swingable frame members on axes substantially normal to the inclined plane of said conveyor, bale engaging spikes carried by said rotary members journaled in said frame members, bale engaging spikes carried by said rotary member and operative to engage opposite sides of a bale straddled by said rotary members, and means for simultaneously driving said rotary members and said conveyor.

5. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising coacting rotary members operating on axes substantially normal to the inclined plane of said endless conveyor and carrying bale engaging means operative to straddle and engage opposite sides of a bale for moving the bale into engagement with said endless conveyor, a bale engaging and delivering roll journaled adjacent the top of said bale loader for engaging bales delivered by said endless conveyor, a wheeled support for said bale loader, and means driven by said wheeled support for simultaneously driving said conveyor, said rotary members and said delivering roll.

6. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising coacting rotary members operating on axes substantially normal to the inclined plane of said endless conveyor and carrying bale engaging means operative to straddle and engage opposite sides of a bale for moving the bale into engagement with said endless conveyor, a bale engaging and delivering roll journaled adjacent the top of said bale loader for engaging bales delivered by said endless conveyor, a wheeled support for said bale loader, means driven by said wheeled support for simultaneously driving said conveyor, said rotary members and said delivering roll, guide means extending longitudinally of said conveyor, and spring means for continuously urging said guide means into engagement with the bales in the course of the advancement thereof by said conveyor for maintaining successive bales in engagement with said rotary members, said conveyor and said delivery roll.

7. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising coacting rotary members operating on axes substantially normal to the inclined plane of said endless conveyor and carrying bale engaging means operative to straddle and engage opposite sides of a bale for moving the bale into engagement with said endless conveyor, longitudinally extending guide bars suspended by said frame structure, spring means disposed between said frame structure and said guide bars for continuously urging said guide bars into engagement with the bales elevated by said conveyor, and yieldable means carried by the ends of said guide bars for guiding bales into engagement with said rotary means and said conveyor.

8. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising coacting rotary members operating on axes substantially normal to the inclined plane of said endless conveyor and carrying bale engaging means operative to straddle and engage opposite sides of a bale for moving the bale into engagement with said endless conveyor, longitudinally extending guide bars yieldably suspended with respect to said frame structure, spring means for continuously urging said guide bars into engagement with the bales elevated by said conveyor, and spring means carried by each end of said guide bars for yieldably urging bales into engagement with said coacting rotary members and said conveyor.

9. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising rotary members operating on axes substantially normal to the inclined plane of said endless conveyor and carrying bale engaging means operative to straddle and engage a bale for moving the bale into engagement with said endless conveyor, a power driven bale engaging and delivering roll adjacent the top of said endless conveyor, a platform for receiving bales delivered by said endless conveyor under control of said bale engaging and delivering roll, and flexible spring-like members extending from said frame structure and above said platform for engaging the bales as they advance over said bale engaging and delivering roll for imparting a change in the direction of movement of said bale on said platform as the bale is propelled under control of said bale engaging and delivering roll.

10. A bale loader comprising a frame structure including an endless conveyor for elevating and delivering bales in an inclined plane from a position adjacent the base of the loader to a position adjacent the top of the bale loader, bale pick-up means disposed adjacent the base of said bale loader comprising rotary members operating on axes substantially normal to the inclined plane of said endless conveyor and carrying bale engaging means operative to straddle and engage a bale for moving the bale into engagement with said endless conveyor, bale engaging and delivering means adjacent the top of said endless conveyor, longitudinally extending guide bars yieldably supported by said frame structure and continuously urged into engagement with the bales as they approach the top of said conveyor, and resilient means carried by said guide bars for engaging and urging successive bales into engagement with said rotary members, said endless conveyor and said bale engaging and delivering means.

ISAAC Z. SMOKER.